(12) United States Patent
Yokota et al.

(10) Patent No.: US 7,475,590 B2
(45) Date of Patent: Jan. 13, 2009

(54) SEAL CHECKER

(75) Inventors: Yuji Yokota, Ritto (JP); Seisaku Iwasa, Ritto (JP)

(73) Assignee: Ishida Co., Ltd., Kyoto (JP)

( * ) Notice: Subject to any disclaimer, the term of this patent is extended or adjusted under 35 U.S.C. 154(b) by 208 days.

(21) Appl. No.: 11/563,636

(22) Filed: Nov. 27, 2006

(65) Prior Publication Data

US 2007/0125183 A1   Jun. 7, 2007

(30) Foreign Application Priority Data

Nov. 30, 2005   (JP)   ............... 2005-345052

(51) Int. Cl.
*G01M 3/36* (2006.01)

(52) U.S. Cl. ....................................... 73/45.4

(58) Field of Classification Search ............ 73/41, 73/45.4, 49.3, 52, 818
See application file for complete search history.

(56) References Cited

U.S. PATENT DOCUMENTS

| | | | |
|---|---|---|---|
| 4,671,101 A | | 6/1987 | Franklin |
| 4,697,452 A | * | 10/1987 | Prakken ........................ 73/49.3 |
| 4,922,746 A | * | 5/1990 | Hulsman et al. ............. 73/49.3 |
| 4,955,226 A | * | 9/1990 | Beaty et al. ................... 73/49.3 |
| 5,507,177 A | * | 4/1996 | Focke ........................... 73/49.3 |
| 5,533,385 A | * | 7/1996 | Frievalt ........................ 73/49.3 |
| 5,542,288 A | * | 8/1996 | Fenlon .......................... 73/49.3 |
| 5,767,392 A | * | 6/1998 | Belcher et al. ................... 73/41 |
| 5,786,530 A | * | 7/1998 | Fenlon .......................... 73/49.3 |
| 6,330,823 B1 | * | 12/2001 | Raymond ........................ 73/52 |
| 6,474,141 B1 | * | 11/2002 | Takaoka et al. ............. 73/49.3 |
| 6,941,796 B2 | * | 9/2005 | Bennett ........................ 73/49.3 |
| 7,107,823 B1 | * | 9/2006 | Lovvorn ....................... 73/49.3 |
| 7,156,238 B2 | * | 1/2007 | Elbersen ...................... 209/599 |

FOREIGN PATENT DOCUMENTS

| | | |
|---|---|---|
| EP | 0 206 365 A2 | 12/1986 |
| EP | 0 614 834 A1 | 9/1994 |
| EP | 1 086 897 A2 | 3/2001 |
| EP | 1 369 362 A1 | 12/2003 |
| JP | 2003-156403 A | 5/2003 |

* cited by examiner

*Primary Examiner*—John Fitzgerald
(74) *Attorney, Agent, or Firm*—Global IP Counselors, LLP (57) ABSTRACT

A seal checker capable of reliably detecting a faulty seal at a vertical seal portion of a packaging bag or a portion thereof covered by the vertical seal portion is provided. A lower transfer conveyor conveys a packaging bag such that a vertical seal portion thereof moves along the conveyance direction. The upper and lower transfer conveyors sandwich and press the packaging bag therebetween. A servo motor detects the distance between the transfer conveyors when the packaging bag is pressed thereby. A control unit determines the seal properties of the packaging bag based on the distance detected by the servo motor. A gap is provided on a conveyance surface of one of the transfer conveyors to which the vertical seal portion faces, which extends in the conveyance direction and prevents the vertical seal portion from being pressed.

5 Claims, 13 Drawing Sheets

SEAL CHECKER

CROSS-REFERENCE TO RELATED APPLICATIONS

This application claims priority to Japanese Patent Application No. 2005-345052. The entire disclosure of Japanese Patent Application No. 2005-345052 is hereby incorporated herein by reference.

BACKGROUND OF THE INVENTION

1. Field of the Invention

The present invention relates to a seal checker configured to conduct a seal check of packaging bags by pressing the packaging bags. Furthermore, the present invention belongs to the technical field of quality inspection of packaging bags.

2. Background Information

Generally, a packaging bag in which contents such as snack foods are packaged is subjected to a seal check in order to detect bags whose contents may quickly deteriorate due to a faulty seal. One device that conducts such a seal check is, for example, the seal checker disclosed in Japan Patent Application Publication No. 2003-156403.

With the seal checker disclosed in Japan Patent Application Publication No. 2003-156403, in the course of conveying a packaging bag supplied from the upstream side of the seal checker while sandwiching the packaging bag between upper and lower transfer conveyors, the seal checker will press the packaging bag with a pressing member mounted on the upper transfer conveyor, and detect the displacement of the pressing member or the reaction force to the pressure which acts on the pressing member at the time of pressing, and thereby conduct the seal check of the packaging bag.

In order to ensure an escape path for the air and the like inside the packaging bag to the exterior thereof when the packaging bag is pressed, the conveying belt on the upper transfer conveyor side is formed from a mesh material, and the top panel that presses the packaging bag via the belt comprises a number of grooves inclined in a direction different from the conveyance direction. Accordingly, if there is a faulty seal, the air and the like inside the packaging bag will not be blocked and will quickly leak to the exterior at the time of pressing, and therefore the seal check of the packaging bag will be properly conducted.

Figure 13:
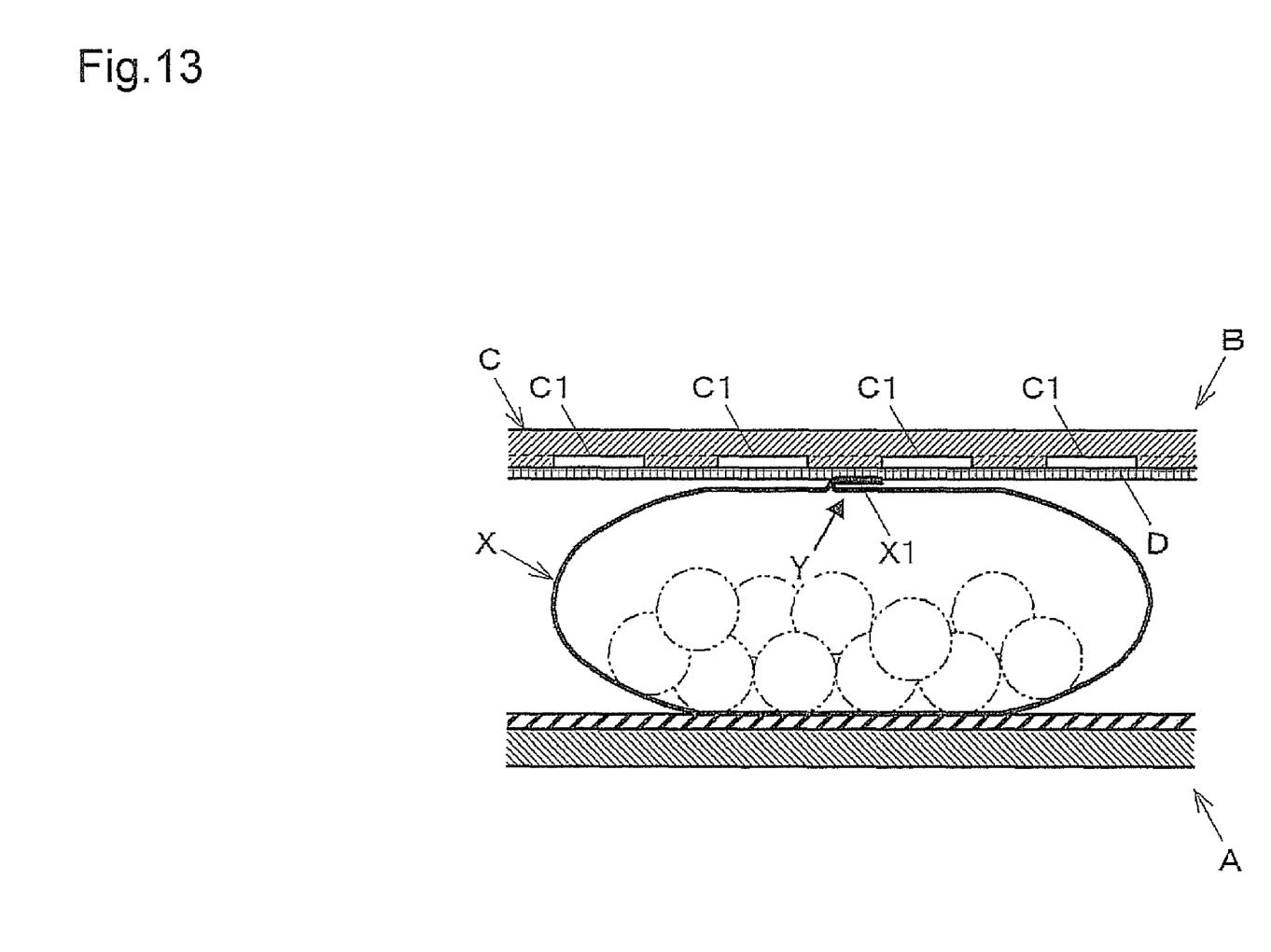
FIG. 13 is a conceptual diagram which explains a problem with a conventional seal checker.

In addition, with the seal checker described in the above-described patent publication, for example, as shown in FIG. 13, a packaging bag X is supplied between upper and lower transfer conveyors A, B with a vertical seal portion X1 facing a top panel C disposed above. In this case, even when an upper conveying belt D is formed from a mesh material and the top panel C comprising a number of grooves C1 . . . C1 inclined in a direction different from the conveyance direction is used, the vertical seal portion X1 will still be pressed by the top panel C via the conveying belt D, and the top panel C may cover the vertical seal portion X1 having a defect therein. Further, even if there is a pinhole under the vertical seal portion X1 indicated by arrow Y, the vertical seal portion X1 will be pressed down by the top panel C, so that the escape path for air and the like may be blocked. Therefore, it is still difficult to reliably detect a faulty seal in the vertical seal portion X1 and the portion Y covered by the vertical seal portion X1.

In view of the above, it will be apparent to those skilled in the art from this disclosure that there exists a need for an improved seal checker capable of reliably detecting a faulty seal at a seal portion or a portion covered by the seal portion, and particularly in a vertical seal portion or a portion covered by the vertical seal portion of a packaging bag. This invention addresses this need in the art as well as other needs, which will become apparent to those skilled in the art from this disclosure.

SUMMARY OF THE INVENTION

The present invention is characterized by having the following configuration.

A seal checker according to a first aspect of the present invention comprises a lower conveyance unit, an upper conveyance unit, a detection unit, and a determination unit. The lower conveyance unit conveys a packaging bag such that a vertical seal portion thereof moves along a conveyance direction. The upper conveyance unit sandwiches and presses the packaging bag between the upper conveyance unit and the lower conveyance unit. The detection unit detects the distance between the upper and lower conveyance units when the packaging bag is pressed thereby, or detects the load applied by the upper and lower conveyance units when the packaging bag is pressed thereby. The determination unit determines whether or not the packaging bag is sealed based on the distance or the load detected by the detection unit. The conveyance surface of the conveyance unit that the vertical seal portion faces comprises a pressure-reducing portion that extends in the conveyance direction and prevents the vertical seal portion from being pressed.

According to the first aspect of the present invention, a pressure-reducing portion is provided on the conveyance surface of the conveyance unit to which the vertical seal portion faces in order to prevent the vertical seal portion from being pressed. Accordingly, the vertical seal portion of the packaging bag pressed by the upper and lower conveyance units will be inserted in the pressure-reducing portion. Consequently, even when there is a defect such as a small hole or a break at the vertical seal portion or a portion of the packaging bag covered by the vertical seal portion, such a small hole or a break will not be covered. In other words, even if there is a defect at the vertical seal portion or a portion of the packaging bag covered by the vertical seal portion, an escape path for the air and the like inside the packaging bag to the exterior will be ensured at the time of pressing, therefore enabling the reliable detection of a faulty seal.

A seal checker according to a second aspect of the present invention is the seal checker according to the first aspect of the present invention, wherein, on the above described conveyance surface, a projection member is arranged at least near the pressure-reducing portion.

According to the second aspect of the present invention, a projection member is provided near the pressure-reducing portion on the conveyance surface of the conveyance unit which the vertical seal portion faces. Consequently, at the time of pressing, a portion of the vertical seal portion will be inserted in the pressure-reducing portion and expanded, and a portion near the vertical seal portion will be pushed up by the projection members. As a result, complicated deformation will occur at and near the vertical seal portion, which will facilitate the detection of defects, if there are any, at the vertical seal portion or the portion covered by the vertical seal portion.

A seal checker according to a third aspect of the present invention is the seal checker according to the first aspect of the present invention, wherein the conveyance unit that the vertical seal portion faces comprises two conveying members that form the conveyance surface, and a plate member that supports the conveying members. The pressure-reducing portion comprises a gap arranged between the conveying members. The plate member comprises a recess groove that is positioned to correspond to the gap.

According to the third aspect of the present invention, the plate member demonstrates the pressing effect thereof, further ensuring the detection of a faulty seal. Further, the plate member is provided with a recess groove, which will consequently ensure a sufficient depth for enabling the vertical seal portion to be inserted therein at the time of pressing. Providing the recess groove to the plate member is preferable, particularly when a conveying member having a thin thickness is used. This configuration would further facilitate the effect of the second aspect of the present invention.

A seal checker according to a fourth aspect of the present invention is the seal checker according to the first aspect of the present invention, wherein the seal checker further comprises a guide unit. The guide unit is arranged on the upstream side of the pressing portions of the upper and lower conveyance units, and guides the packaging bag such that the vertical seal portion is positioned to correspond to the position of the pressure-reducing portion.

According to the fourth aspect of the present invention, the packaging bag is guided by the guide unit such that the vertical seal portion is positioned to correspond to the position of the pressure-reducing portion. Consequently, the vertical seal portion will be stably inserted in the pressure-reducing portion at the time of pressing, therefore further enabling the reliable detection of a faulty seal. A packaging bag manufactured by a vertical pillow type bag manufacturing and packaging apparatus drops therefrom and then is supplied to the downstream side of the seal checker, and the orientation of the vertical seal portion is not always stable. Therefore, the fourth aspect of the present invention is especially preferable when such a bag manufacturing and packaging apparatus is disposed on the upstream side.

A seal checker according to a fifth aspect of the present invention comprises a lower conveyance unit, an upper conveyance unit, a detection unit, and a determination unit. The lower conveyance unit conveys a packaging bag such that a seal portion thereof moves along a conveyance direction. The upper conveyance unit sandwiches and presses the packaging bag between the upper conveyance unit and the lower conveyance unit. The detection unit detects the distance between the upper and lower conveyance units when the packaging bag is pressed thereby, or detects the load applied by the upper and lower conveyance units when the packaging bag is pressed thereby. The determination unit determines whether or not the packaging bag is sealed based on the distance or the load detected by the detection unit. The conveyance surface of the conveyance unit that the seal portion faces comprises a pressure-reducing portion that extends in the conveyance direction and prevents the seal portion from being pressed.

According to the fifth aspect of the present invention, the pressure-reducing portion is provided on the conveyance surface of the conveyance unit which the seal portion faces, and prevents the seal portion from being pressed. Accordingly, the seal portion of the packaging bag pressed by the upper and lower conveyance units will be inserted in the pressure-reducing portion. Consequently, even if there is a defect such as a small hole or a break at the seal portion or at the portion of the packaging bag covered by the seal portion, such a small hole or a break will not be covered. In other words, even if there is a defect at the seal portion or at the portion of the packaging bag covered by the seal portion, an escape path for air and the like inside the packaging bag to the exterior thereof will be ensured at the time of pressing, therefore enabling the reliable detection of a faulty seal.

These and other objects, features, aspects, and advantages of the present invention will become apparent to those skilled in the art from the following detailed description, which taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
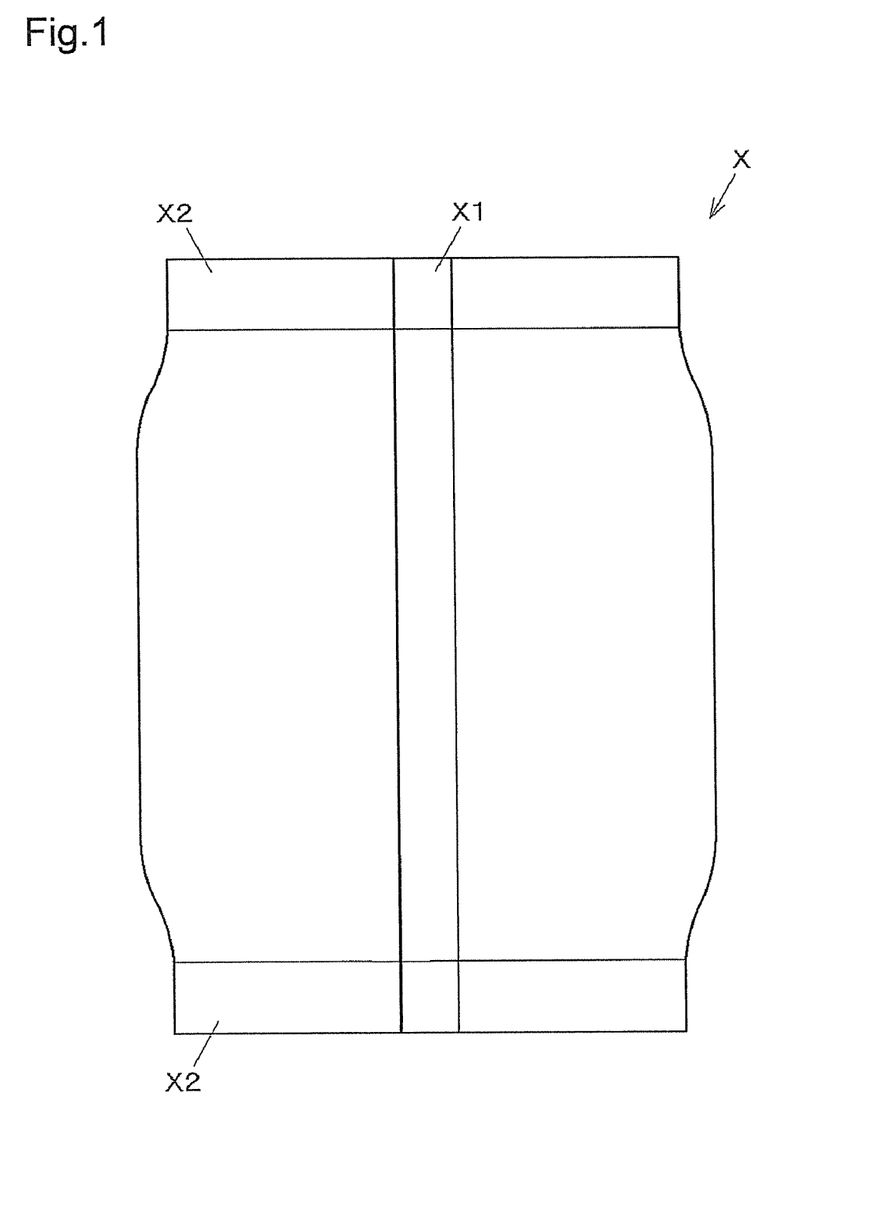
FIG. 1 is a plan view of a packaging bag according to one embodiment of the present invention.

As shown in FIG. 1, a packaging bag X described in this specification is manufactured by forming a sheet-like wrapping material into a tube shape such that the edges of the wrapping material overlap, thermally sealing the overlapping portion in the lengthwise direction, and thermal sealing an upper portion and a lower portion of the wrapping material in the lateral direction. In other words, this packaging bag X has a vertical seal portion X1, and a pair of transverse seal portions X2, X2 formed thereon.

Figure 2:
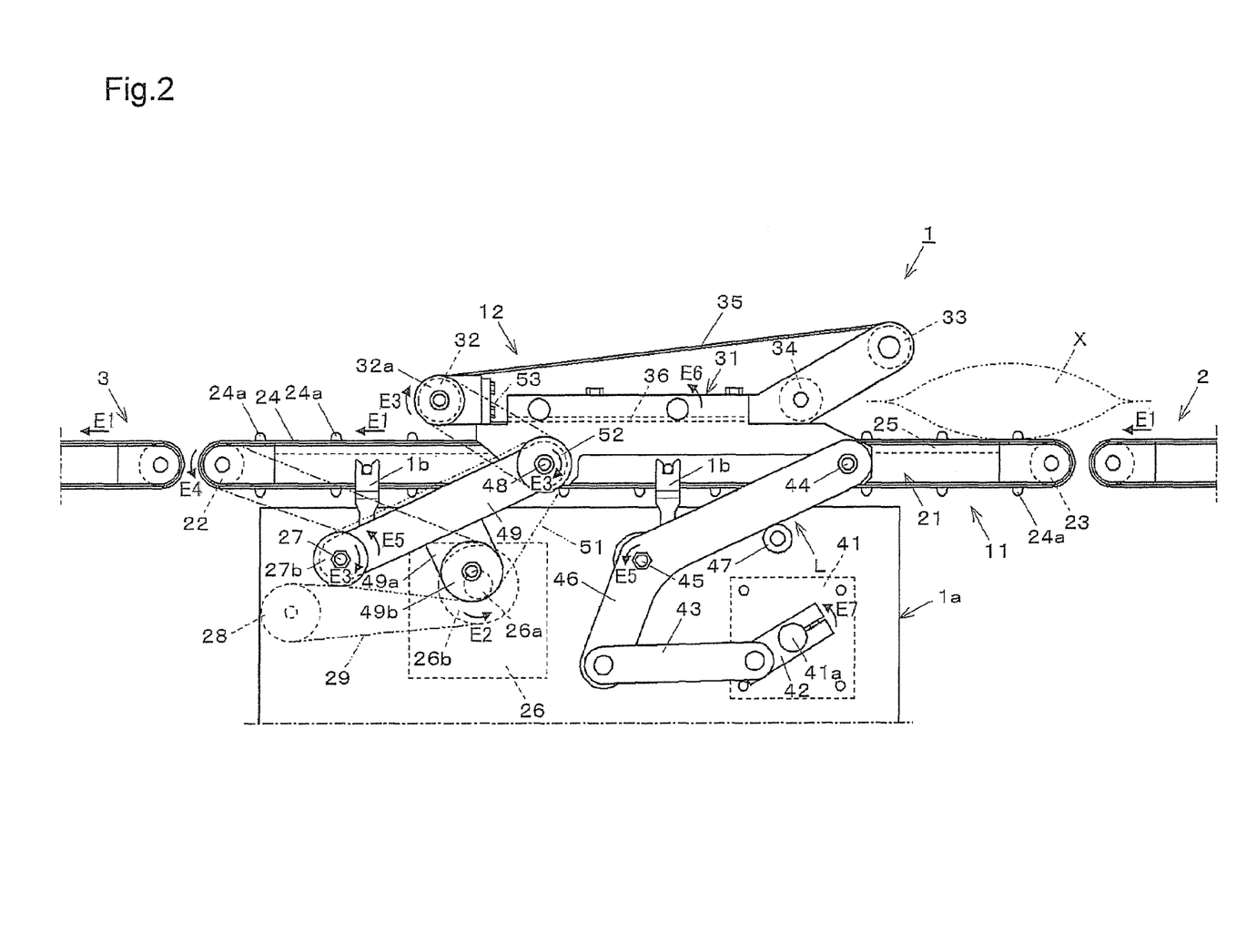
FIG. 2 is a lateral view of a seal checker.
Figure 3:
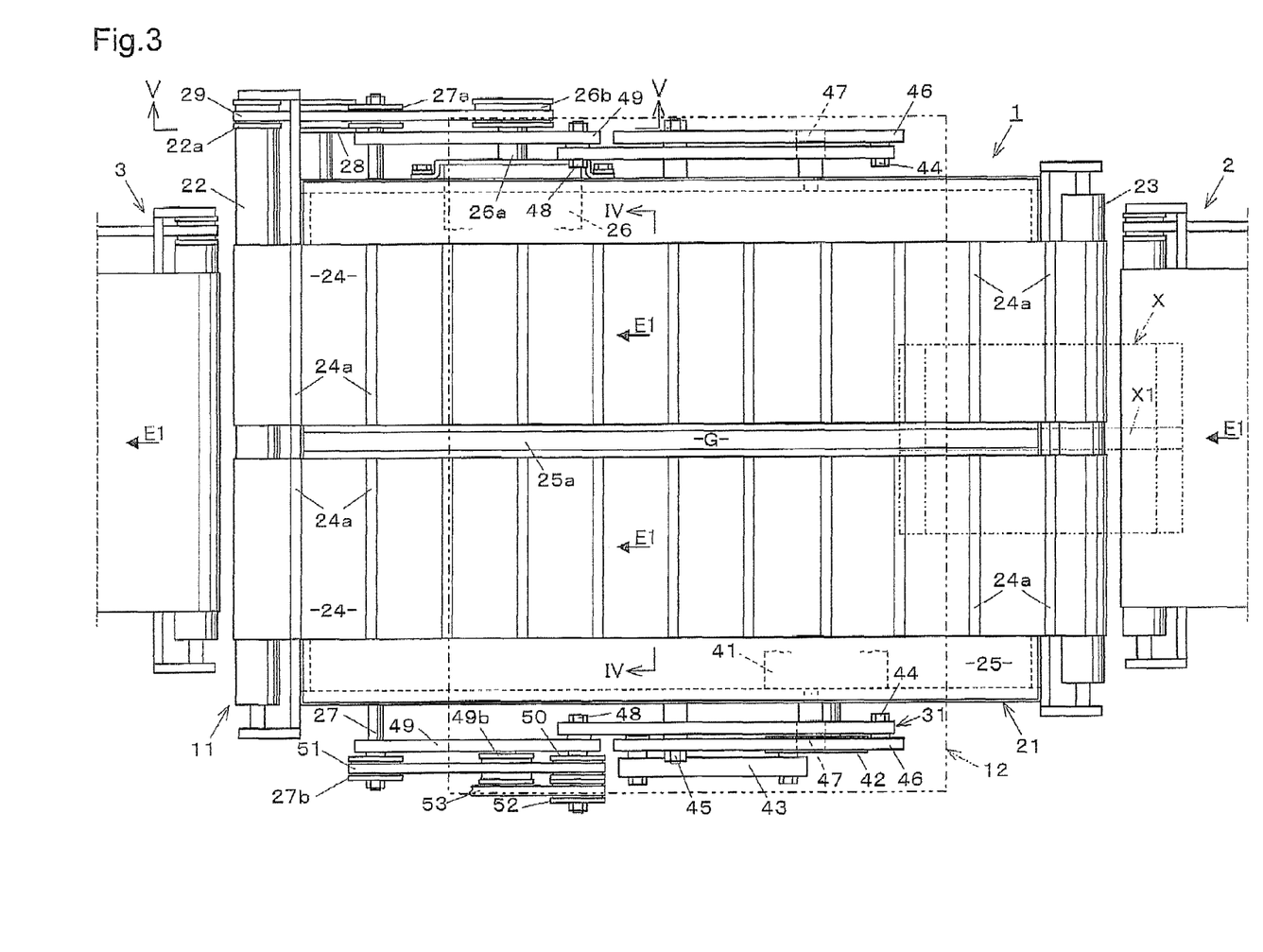
FIG. 3 is a plan view of the seal checker.

A seal checker 1 shown in FIGS. 2, 3 is disposed between a carry-in conveyor 2 on the upstream side and a carry-out conveyor 3 on the downstream side, and includes transfer conveyors 11, 12 disposed above and below so as to face each other. The packaging bag X is conveyed in the arrow E1 direction with the vertical seal portion X1 facing downward. Note that the "left" and "right" direction in the description below indicates the "left" and "right" direction respectively when the downstream side is viewed from the upstream side.

Figure 4:
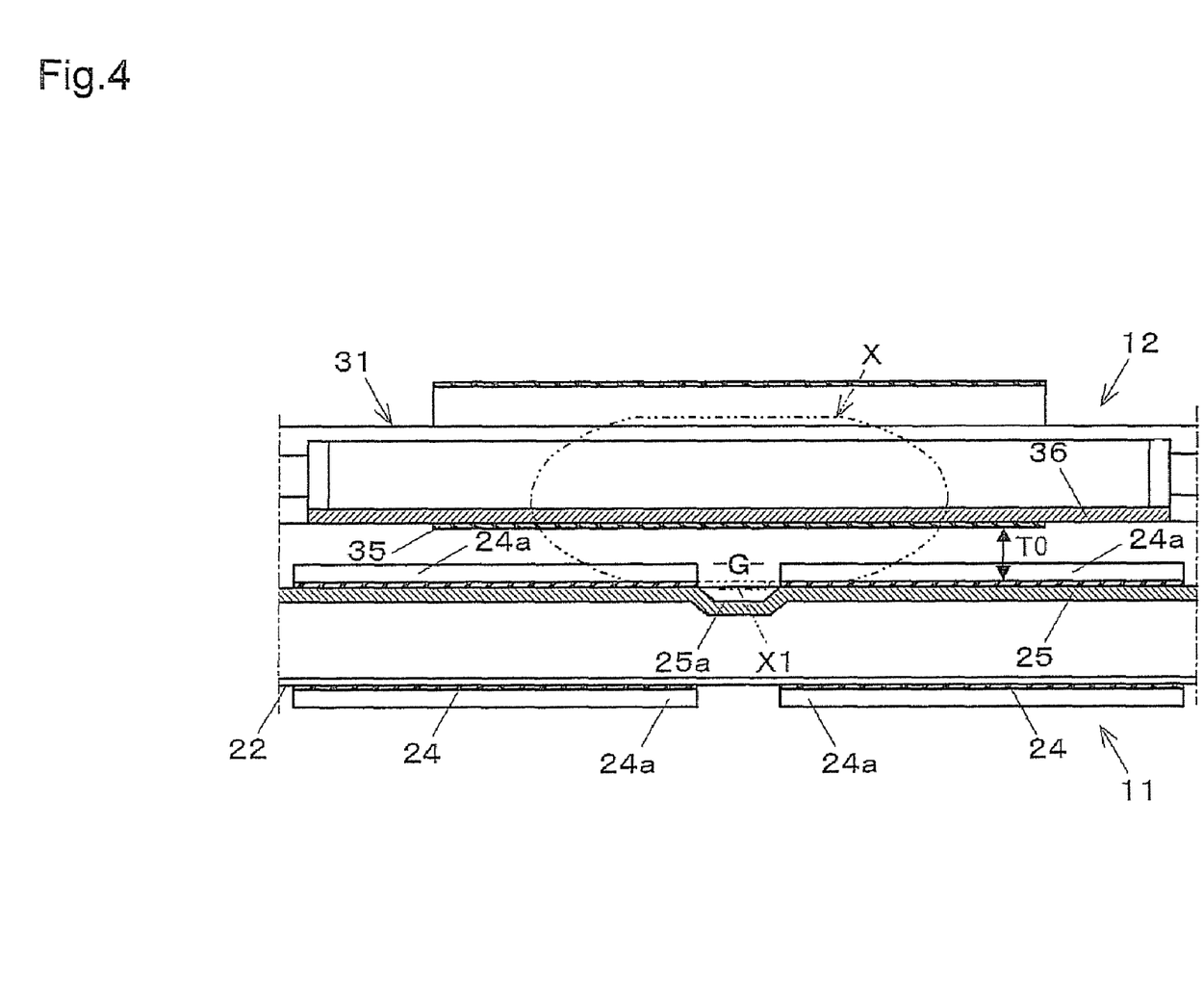
FIG. 4 is an enlarged sectional view of a principal portion of the seal checker taken along IV-IV line in FIG. 3.

As shown in FIGS. 2 to 4, the lower transfer conveyor 11 is removably mounted above a main body frame 1a via a plurality of supporting members 1b . . . 1b, and is configured to support and convey the packaging bag X from below. The lower transfer conveyor 11 includes a frame 21, a pair of rollers 22, 23 freely rotatably supported at both upstream and downstream end portions of the frame 21, and a pair of conveying belts 24, 24 wound around and extending between the rollers 22, 23. The pair of conveying belts 24, 24 is separated on the left and right with a gap G therebetween. The gap G is capable of accommodating the vertical seal portion X1 of the packaging bag X. Each conveying belt 24 is provided with a plurality of projection members 24a . . . 24a extending in a direction perpendicular to the conveyance direction E1, with a predetermined gap between the projection members 24a . . . 24a across the full length of the conveying belt 24 in the conveyance direction E1. On the upper surface of the frame 21, a top panel 25 is provided to support the pair of conveying belts 24, 24. On the upper surface of the top panel 25, a recess groove 25a extends in the conveyance direction E1 at a position corresponding to the gap G between the conveying belts 24, 24.

Figure 5:
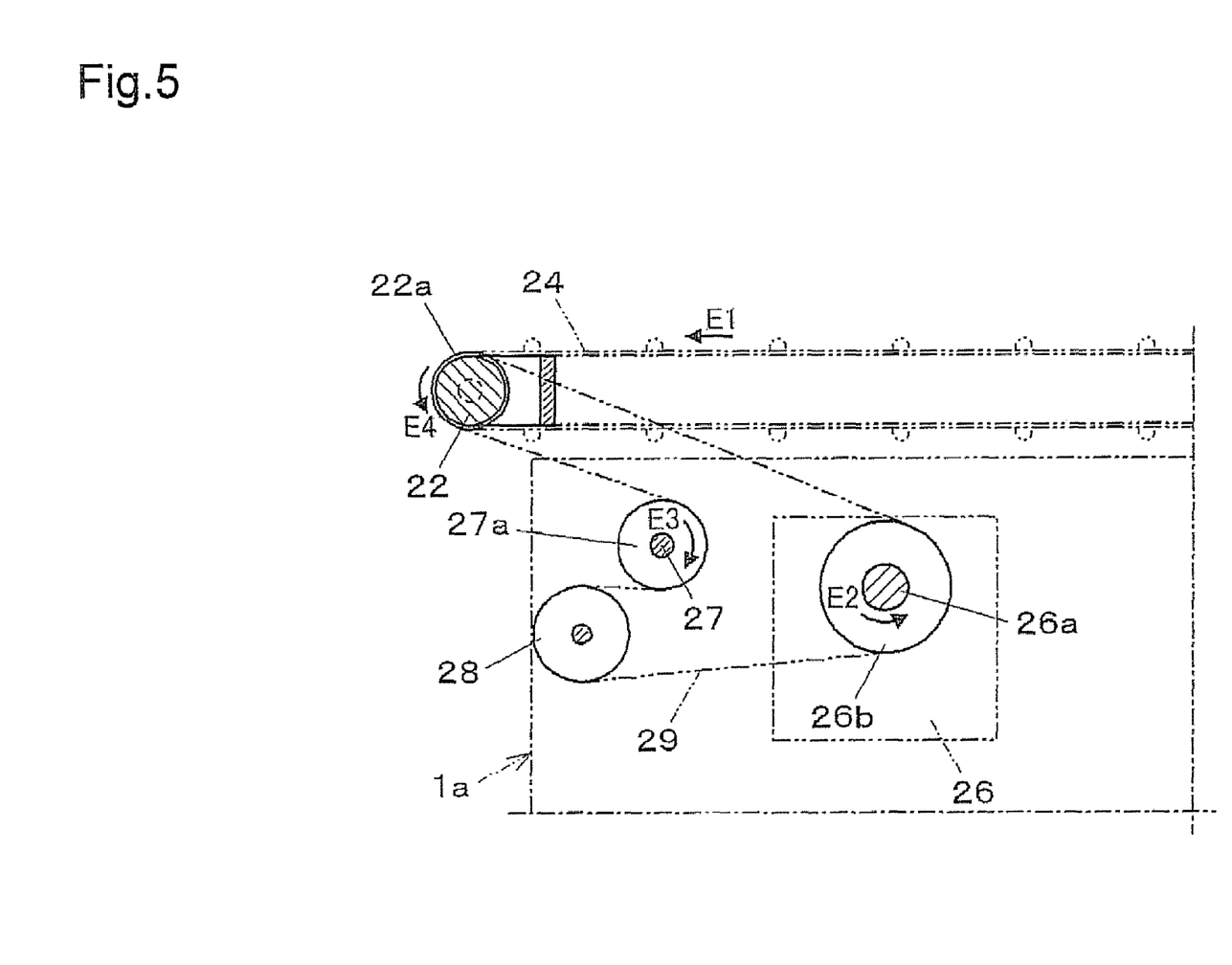
FIG. 5 is an enlarged sectional view of a principal portion of the seal checker taken along V-V line in FIG. 3.

As shown in FIGS. 2, 3, and 5, a motor 26 is attached to the right side of the main body frame 1a. A pulley 26b is mounted on an output axis 26a of the motor 26. A pulley 22a is mounted coaxially to the downstream side roller 22. A pulley 27a and a pulley 27b are mounted on the right end and left end portions respectively of a support shaft 27 that penetrates the main body frame 1a from left to right. A pulley 28 is disposed at a predetermined position on the right side of the main body frame 1a. As illustrated in the figures, a timing belt 29 is wound around the pulley 26b, the pulley 22a, the pulley 27a, and the pulley 28.

Consequently, when the pulley 26b on the motor 26 side rotates in the arrow E2 direction, the pulley 27a on the support shaft 27 side rotates in the arrow E3 direction, and simultaneously, the pulley 22a, i.e., the downstream side roller 22, rotates in the arrow E4 direction. Therefore, the conveying belts 24, 24 wound around and extending between the pair of rollers 22, 23 run in the arrow E1 direction. Note that the pulley 28 serves to properly adjust the tension of the timing belt 29, and is capable of moving in the upstream and downstream directions.

Figure 6:
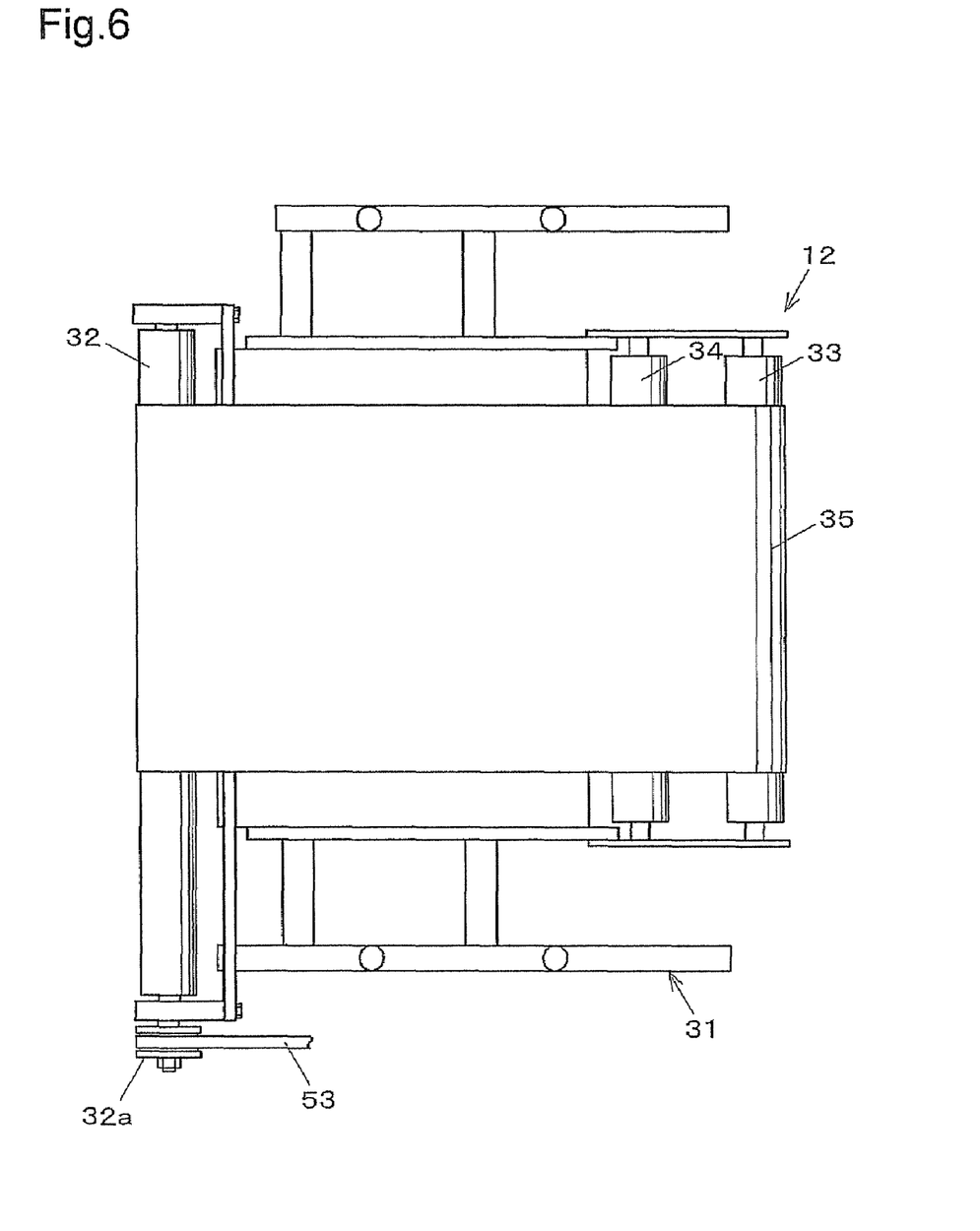
FIG. 6 is a plan view of an upper transfer conveyor.

As shown in FIGS. 2, 4, and 6, the upper transfer conveyor 12 and the lower transfer conveyor 11 sandwich and press the packaging bag X therebetween. The upper transfer conveyor 12 includes a frame 31, three rollers 33, 32, 34 freely rotatably supported at both upstream and downstream end portions and near the upstream end portion of the frame 31 respectively, and a conveying belt 35 wound around and extending over the rollers 32, 33, 34. Underneath the frame 31, a top panel 36 is provided in order to support the conveying belt 35 between the rollers 32, 34. The upstream side roller 33 is arranged to be above the roller 34, and the conveying belt 35 is inclined upward in the upstream direction across a predetermined range. In other words, the packaging bag X will be smoothly introduced between the transfer conveyors 11, 12.

As shown in FIGS. 2 and 3, a servo motor 41 is disposed on the upstream side and on the left side of the main body frame 1a. One end portion of a lever member 42 is mounted to an output axis 41a of the servo motor 41. Connected to the other end portion of the lever member 42 is one end portion of an intermediate link member 43 in a linear shape. Connected to the other end portion of the intermediate link member 43 is one end portion of a left side first link member 46 of a pair of left and right first link members 46, 46 in a V shape. The other end portion of the left side first link member 46 is connected to the upstream side of the frame 31 by a bolt 44. In addition, one end portion of the right side first link member 46 is connected to the upstream side of the frame 31 by the bolt 44. The first link members 46, 46 oscillate in the arrow E5 direction about a support shaft 45 that penetrates the main body frame 1a from left to right. The upstream sides of the upper transfer conveyor 12 and the main body frame 1a are removably connected to each other via the lever member 42, the intermediate link member 43, and the first link members 46, 46.

Stoppers 47, 47 extend outward on both the left and right sides of the main body frame 1a. The longer oscillating end portion of the first link member 46 that oscillates about the support shaft 45 will come into contact with the stopper 47 when the first link member 46 oscillates in the direction opposite from the arrow E5, thereby determining the bottom dead center of the upper transfer conveyor 12. Note that, as shown in FIG. 4, the initial value of the distance between the transfer conveyors 11, 12 when the upper transfer conveyor 12 reaches the bottom dead center is set to be T0, and this distance T0 is narrower than the thickness of the packaging bag X carried into the seal checker 1.

In addition, on the downstream side, the downstream side of the upper transfer conveyor 12 and the main body frame 1a are removably connected to each other via a pair of left and right second link members 49, 49 in a linear shape, which oscillate in the arrow E5 direction about the support shaft 27. One end portion of each second link member 49 is mounted to a left end portion or right end portion of the support shaft 27, and the other end portion is connected to the downstream side of the frame 31 by a bolt 48.

Consequently, a four-node parallel linkage mechanism L is comprised of the main body frame 1a on the lower side, the frame 31 on the upper side, and the first and second link members 46, 46, and 49, 49 on the upstream and downstream sides. The upper transfer conveyor 12 is capable of moving in the arrow E6 direction while constantly maintaining a parallel relationship with respect to the lower transfer conveyor 11 via the linkage mechanism L.

When the upper transfer conveyor 12 is pushed up in the arrow E6 direction by the packaging bag X moving underneath, each of the first and second link members 46, 46 and 49, 49 oscillates in the arrow E5 direction. As a result, the output axis 41a of the servo motor 41 will rotate in the arrow E7 direction. In other words, such movement of the parallel linkage mechanism L can be detected via the rotation of the output axis 41a of the servo motor 41.

As shown in FIGS. 2 and 3, a timing belt 51 is wound around the pulley 27b mounted to the left side of the support shaft 27, the pulley 49b extending outward on an extending portion 49a of the left side second link member 49, and the pulley 50 mounted to a support shaft that penetrates the second link member 49 near the downstream end portion on the left side of the frame 31. In addition, as shown in FIGS. 2, 3, and 6, a timing belt 53 is wound around a pulley 52 mounted coaxially to the outer side of the pulley 50, and a pulley 32a mounted coaxially to the downstream side roller 32 of the upper transfer conveyor 12. Note that the pulley 49b serves to properly adjust the tension of the timing belt 51, and the location thereof can be moved.

Accordingly, as shown in FIGS. 2 and 5, when the pulley 26b on the motor 26 side rotates in the arrow E2 direction, the pulleys 27a, 27b on the support shaft 27 side and the pulleys 50, 52 on the frame 31 side will rotate in the arrow E3 direction. As a result, as shown in FIG. 2, the pulley 32a, i.e., the downstream side roller 32 will rotate in the arrow E3 direction, and therefore the conveying belt 35 wound around and extending over the rollers 32, 33, 34 of the upper transfer conveyor 12 will run in the arrow E1 direction, the same as the both conveying belts 24, 24 of the lower transfer conveyor 11.

Figure 7:
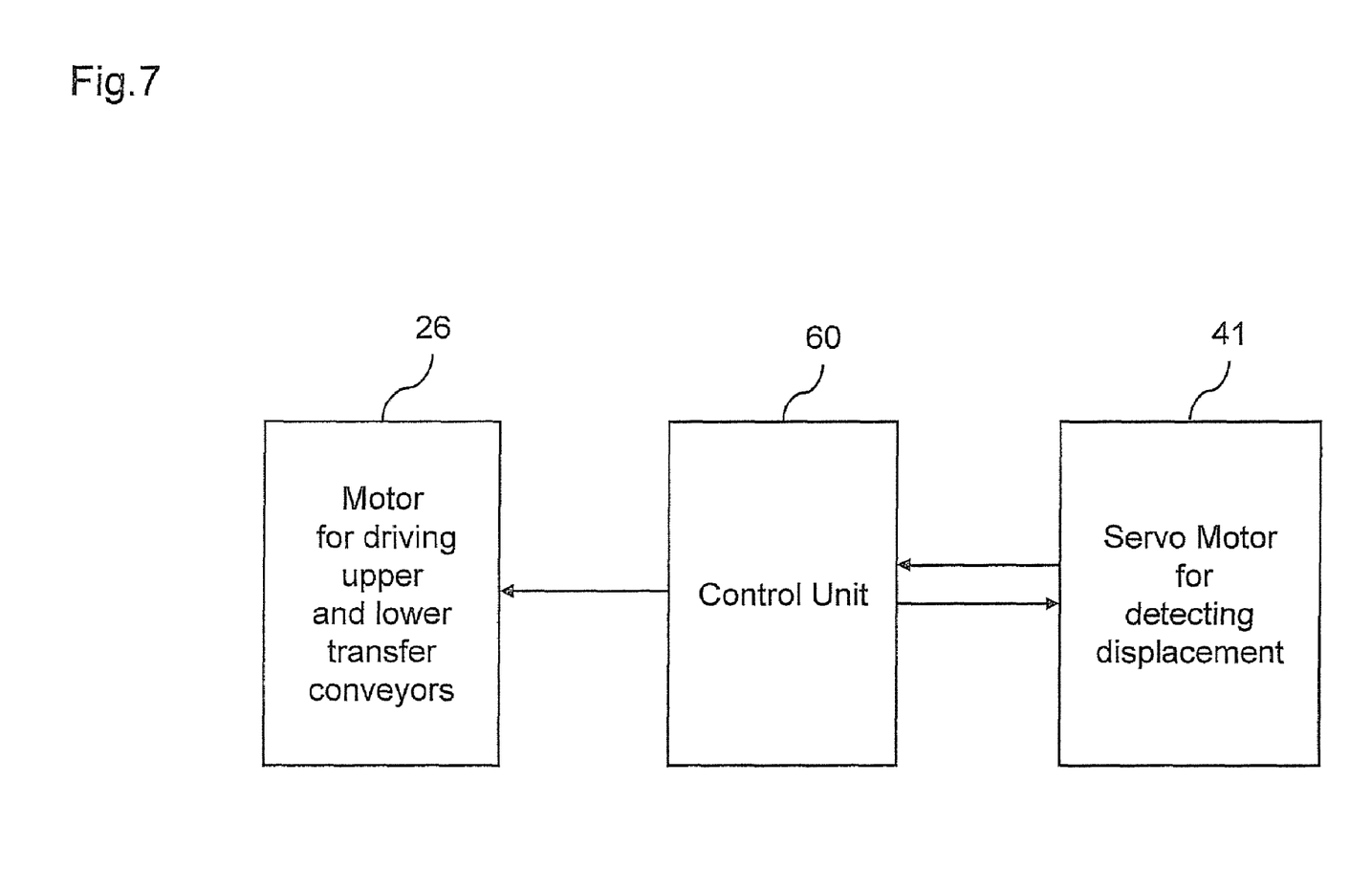
FIG. 7 is a block diagram showing the configuration of a control system.

Next, the control system of this seal checker 1 will be described. As shown in FIG. 7, a control unit 60 that controls the seal checker 1 outputs a control signal to the motor 26 that drives the upper and lower transfer conveyors 11, 12. In addition, the control unit 60 outputs to the servo motor 41 a control signal which causes both transfer conveyors 11, 12 press the packaging bag X with a predetermined pressing force. A detection signal outputted from the servo motor 41 with respect to the distance between the transfer conveyors 11, 12 when the packaging bag X is pressed is input into the control unit 60. Then, the control unit 60 determines the seal properties of the packaging bag X based on this detection signal.

Next, the operation of this seal checker 1 will be described. As shown in FIGS. 2 to 4, the packaging bag X is carried into the seal checker 1 from the carry-in conveyor 2 such that the vertical seal portion X1 faces downward, and the vertical seal portion X1 is positioned to correspond to the position of the gap G between the left and right conveying belts 24, 24 of the lower transfer conveyor 11 and over the recess groove 25a of the top panel 25. The distance T0 (see FIG. 4) between the transfer conveyors 11, 12 in the initial state is narrower than the thickness of the packaging bag X, so that the upper transfer conveyor 12 will be raised in the arrow E6 direction as the packaging bag X moves between the transfer conveyors 11, 12 in the arrow E1 direction.

Figure 8:
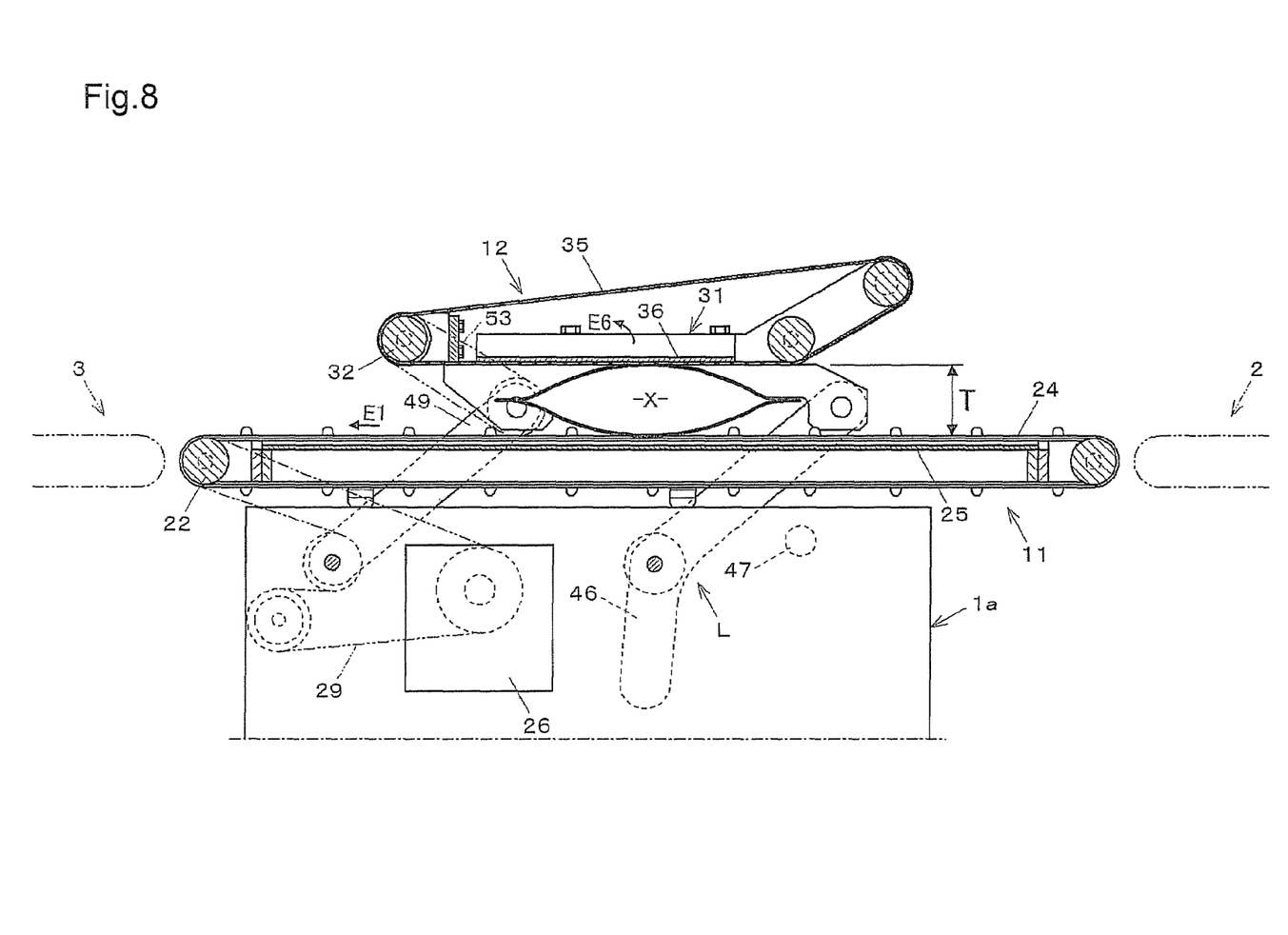
FIG. 8 is a sectional view of upper and lower transfer conveyors at the time of pressing.

At this time, as shown in FIG. 8, the four-node parallel linkage mechanism L comprised of the main body frame 1a, the frame 31, and the first and second link members 46, 46, and 49, 49, is formed between the lower transfer conveyor 11 and the upper transfer conveyor 12 supported by the main body frame 1a. Accordingly, the upper transfer conveyor 12 will be raised in the arrow E6 direction by the packaging bag X delivered from the carry-in conveyor 2 and moving below the upper transfer conveyor 12, while maintaining a parallel relationship with respect to the lower transfer conveyor 11. Note that the longer oscillating end portion of the first link member 46 is away from the stopper 47.

In addition, as shown in FIGS. 2, 5, and 8, the power of the motor 26 mounted to the main body frame 1a on the lower side is transmitted to the downstream side roller 22 of the lower transfer conveyor 11 and the downstream side roller 32 of the upper transfer conveyor 12 via the timing belts 29, 51, 53. As a result, the packaging bag X sandwiched between the upper and lower conveying belts 24, 24, and 35 and between the top panels 25 and 36 is conveyed in a stable manner in the arrow E1 direction.

In addition, the packaging bag X is sandwiched between the conveying belts 24, 24 and the top panel 25 of the lower transfer conveyor 11 and the conveying belt 35 and the top panel 36 of the upper transfer conveyor 12, and also is pressed with a predetermined pressing force via the servo motor 41. The distance T (see FIG. 8) between the transfer conveyors 11, 12 at the time of pressing is detected by the servo motor 41 via the oscillation of the first link member 46, the intermediate link member 43, and the lever member 42. The control unit 60 determines the seal properties of the packaging bag X based on the detection signal. In other words, if the distance T rapidly decreases at the time of pressing, it will be determined to be a faulty seal.

Then, the packaging bag X released from the state of being pressed by the both transfer conveyors 11, 12 is delivered to the carry-out conveyor 3, and further conveyed to processing on the downstream side.

As described above and as shown in FIG. 9, a recessed portion with the gap G as the pressure-reducing portion that alleviates the vertical seal portion X1 from being pressed is provided between the conveying belts 24, 24 that form the conveyance surface of the lower transfer conveyor 11 to which the vertical seal portion X1 faces. Accordingly, the vertical seal portion X1 of the packaging bag X pressed by the upper and lower transfer conveyors 11, 12 will be inserted in the gap G. Therefore, even when there is a defect such as a small hole or a break in the vertical seal portion X1 or in the portion of the packaging bag X covered by the vertical seal portion X1, such a small hole or a break will not be covered. In other words, even when there is a defect in the vertical seal portion X1 or in the portion of the packaging bag X indicated by arrow Y which is covered by the vertical seal portion X1, an escape path for air and the like inside the packaging bag X to the exterior will be ensured at the time of pressing, therefore enabling reliable detection of a faulty seal.

Figure 9:
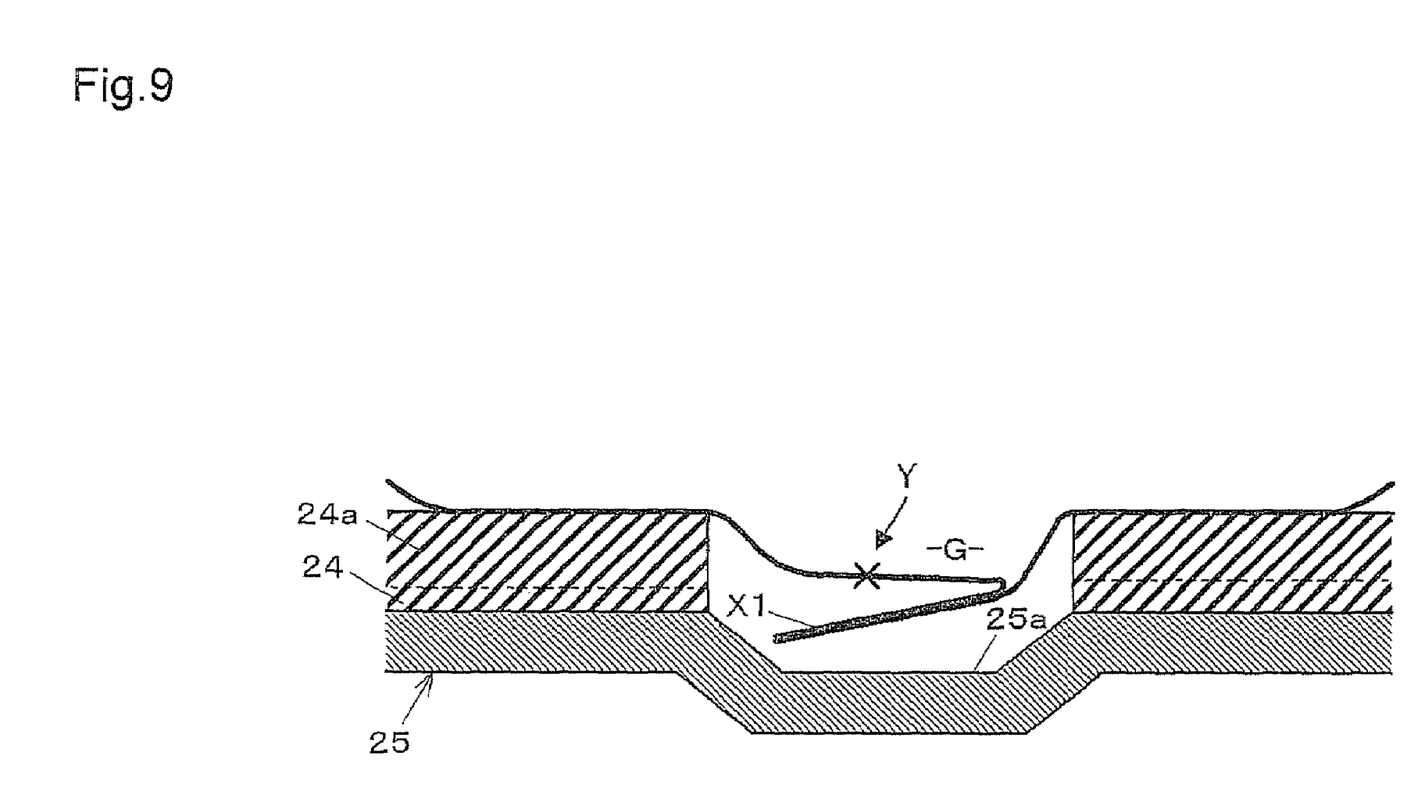
FIG. 9 is a sectional view which explains the effect of providing a gap between the conveying belts, projection members, and a recess groove on a top panel.

In addition, the conveying belts 24, 24 of the lower transfer conveyor 11 which the vertical seal portion X1 faces are provided with the projection members 24a . . . 24a near the gap G. Consequently, at the time of pressing, a portion of the vertical seal portion X1 will be inserted in the gap G and expanded, and a portion near the vertical seal portion X1 will be pushed up by the projection member 24a . . . 24a. As a result, complicated deformation will occur at and near the vertical seal portion X1, which will facilitate the detection of defects, if there are any, at the vertical seal portion X1 or the portion Y covered by the vertical seal portion X1.

Then, the top panel 25 will demonstrate its pressing effect, further ensuring the detection of a faulty seal. In addition, the top panel 25 is provided with the recess groove 25a, which will consequently ensure a sufficient depth for enabling the vertical seal portion X1 to be inserted therein at the time of pressing. Providing the recess groove 25a to the top panel 25 is preferable, especially when the conveying belts 24, 24 having a thin thickness are used. This configuration will further facilitate the effects of the present invention, which result from complicated deformation at and near the above described vertical seal portion X1.

Next, a modification of the present embodiment will be described. Note that components in common with or similar to the above described members will be given the same reference numerals, and descriptions thereof will be omitted.

Figure 10:
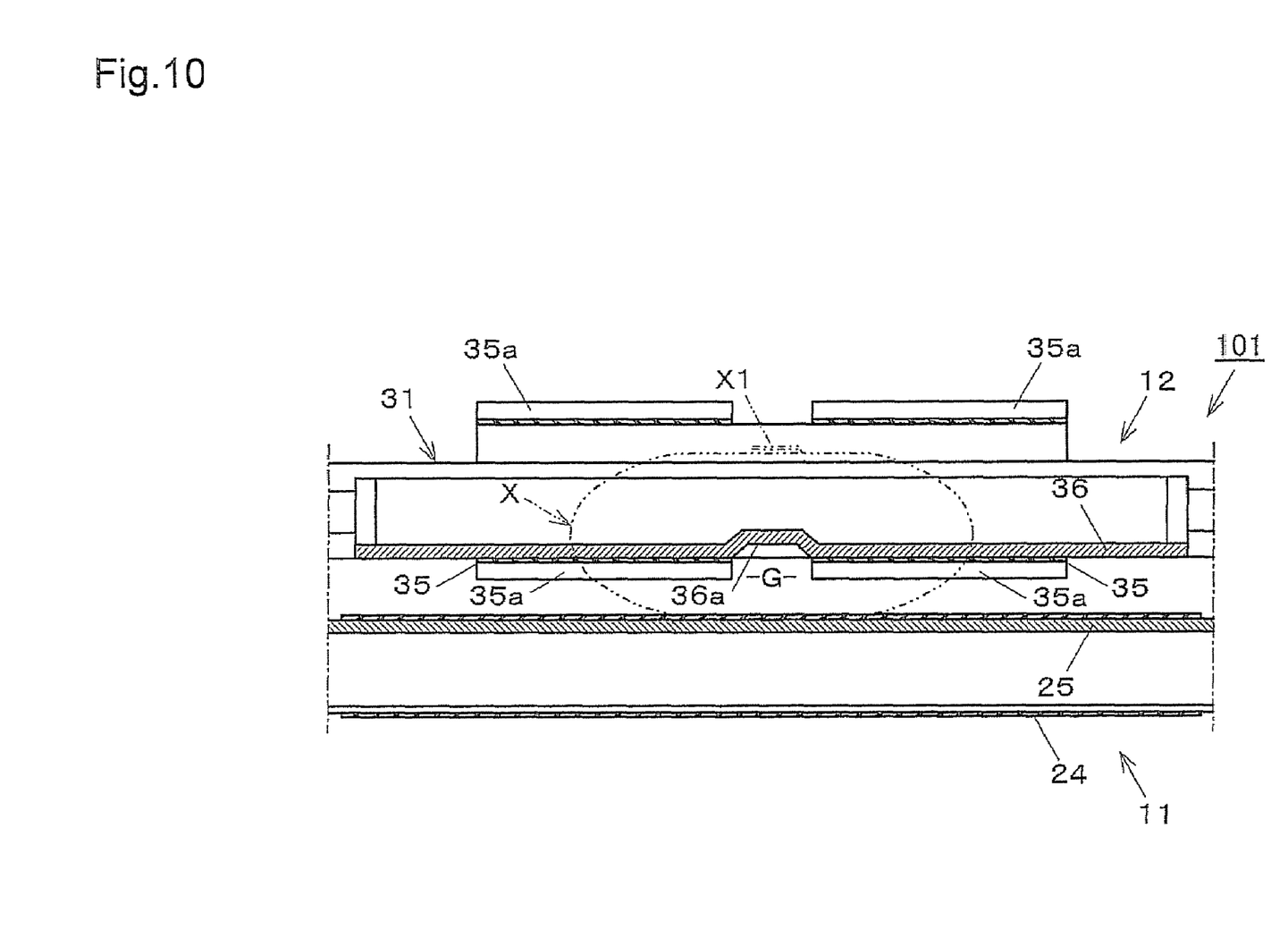
FIG. 10 is a sectional view that corresponds to FIG. 4 showing a modified example of the seal checker.
Figure 11:
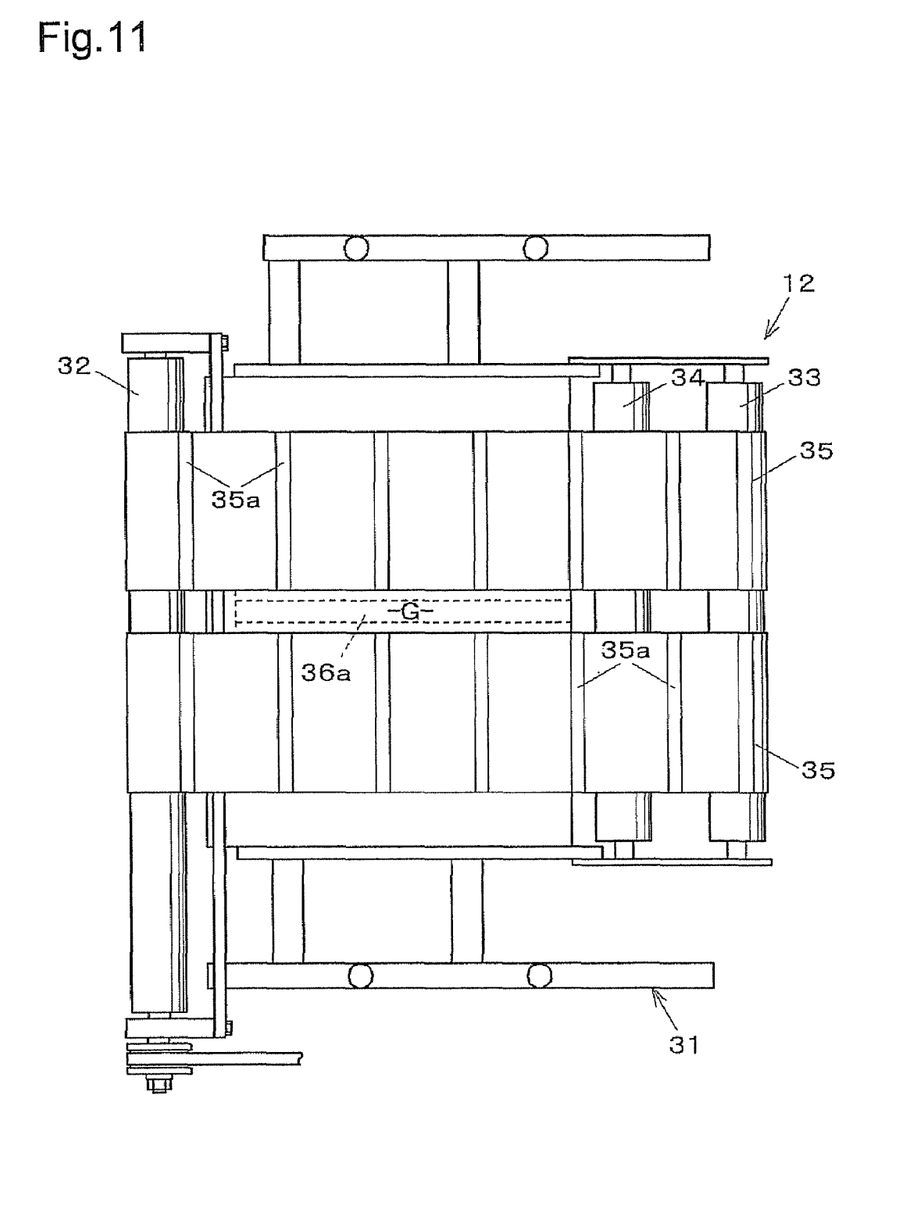
FIG. 11 is a plan view that corresponds to FIG. 6 showing an upper transfer conveyor in accordance with the modified example of the seal checker.

A seal checker 101 shown in FIG. 10 is used when the packaging bag X is supplied with the vertical seal portion X1 facing the upper transfer conveyor 12. The seal checker 101 differs from the seal checker 1 in that the configurations of the conveyance surfaces of the upper and lower transfer conveyors 11, 12 are reversed. In other words, with the seal checker 101, the conveying belt 24 of the lower transfer conveyor 11 is not split; projection members are not provided to the conveying belt 24; and the top panel 25 is not provided with a recess groove. Further, with the seal checker 101, as shown in FIGS. 10 and 11, the conveying belts 35, 35 wound around and extending over the rollers 32, 33, 34 freely rotatably supported by the frame 31 of the upper transfer conveyor 12 are split to the left and right with a gap G therebetween. The conveying belts 35, 35 are provided with a plurality of projection members 35a . . . 35a in the conveyance direction with a predetermined gap therebetween across the full length of the conveying belts 35, 35. On the lower surface of the top panel 36, a recess groove 36a is provided which extends in the conveyance direction at a position corresponding to the gap G.

Also, in this case, as with the seal checker 1, a recessed portion with a gap G that serves as a pressure-reducing portion which alleviates the vertical seal portion X1 from being pressed is provided on the conveying belts 35, 35 that form the conveyance surface of the upper transfer conveyor 12 to which the vertical seal portion X1 faces. Accordingly, the vertical seal portion X1 of the packaging bag X pressed by the upper and lower transfer conveyors 11, 12 will be inserted in the gap G. Therefore, even when there is a defect such as a small hole or a break at the vertical seal portion X1 or at a portion of the packaging bag X covered by the vertical seal portion X1, such a small hole or a break will not be covered. In other words, even when there is a defect at the vertical seal portion X1 or at a portion of the packaging bag X covered by the vertical seal portion X1, an escape path for air and the like inside the packaging bag X to the exterior will be ensured at the time of pressing, therefore enabling reliable detection of a faulty seal.

In addition, the projection members 35a . . . 35a are provided near the gap G on the conveying belts 35, 35 of the upper transfer conveyor 12 to which the vertical seal portion X1 faces. Consequently, at the time of pressing, a portion of the vertical seal portion X1 will be inserted in the gap G and expanded, and a portion near the vertical seal portion X1 will be pushed up by the projection member 35a . . . 35a. As a result, complicated deformation will occur at and near the vertical seal portion X1, which will facilitate the detection of defects, if there are any, at the vertical seal portion X1 or at a portion of the packaging bag X covered by the vertical seal portion X1.

Then, the top panel 36 will demonstrate its pressing effect, further ensuring the detection of a sealing failure. Further, the top panel 36 is provided with the recess groove 36a, which will consequently ensure a sufficient depth for enabling the vertical seal portion X1 to be inserted therein at the time of pressing. Providing the recess groove 36a in the top panel 36 is preferable, especially when the conveying belts 35, 35 having a thin thickness are used. This configuration will further facilitate the effects of the present invention, which results from complicated deformation at and near the above described vertical seal portion X1.

Further, this seal checker 101 may be provided with a guide mechanism that guides the packaging bag X such that the vertical seal portion X1 thereof is positioned to correspond to the position of the gap G.

Figure 12:
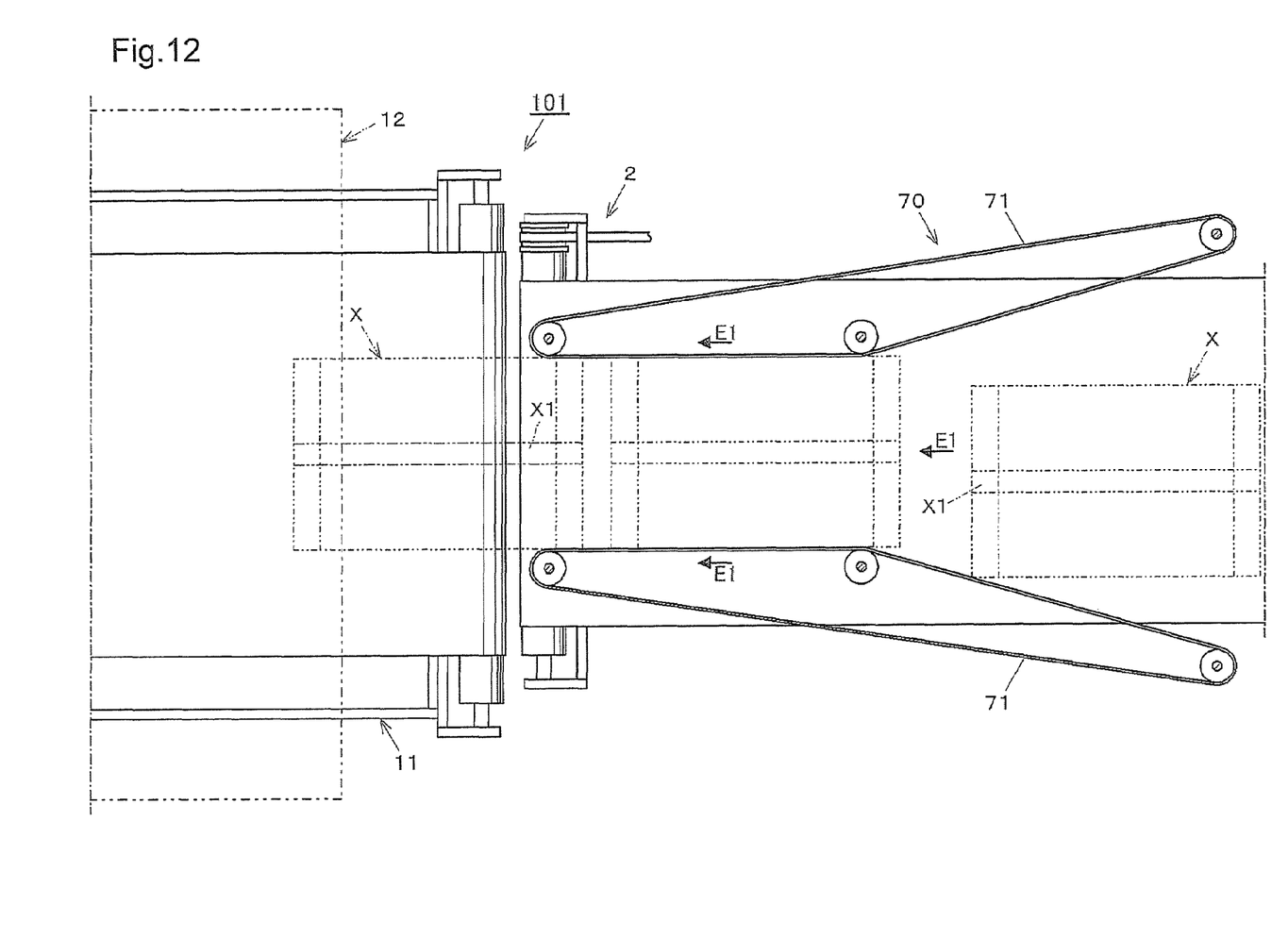
FIG. 12 is a plan view of a guide mechanism.

As shown in FIG. 12, a guide mechanism 70 is disposed on the upstream side of the upper and lower transfer conveyors 11, 12 that are included in the seal checker 101. The conveyance surfaces of a pair of left and right conveying belts 71, 71 extend in the vertical direction, and the conveying belts 71, 71 are suspended and supported by a bracket (not shown) immediately above the carry-in conveyor 2. In addition, the conveying belts 71, 71 are configured to run in the arrow E1 direction by a motor (not shown). The distance between the conveying belts 71, 71 becomes narrower in the direction from the upstream side to the downstream side, and the distance is substantially equal to the width of the packaging bag X on the downstream side. In addition, the conveying belts 71, 71 are disposed such that the vertical seal portion X1 of the packaging bag X that has passed through between the conveying belts 71, 71 is positioned to correspond to the position of the gap G.

As described above, the packaging bag X is guided by the guide mechanism 70 such that the vertical seal portion X1 is positioned to correspond to the position of the gap G as a pressure-reducing portion. Consequently, at the time of pressing, the vertical seal portion X1 will be inserted in the gap G in a stable manner, further enabling reliable detection of a faulty seal. A packaging bag X manufactured by a vertical pillow type bag manufacturing and packaging apparatus drops therefrom and is supplied to the downstream side, and the orientation of the vertical seal portion X1 is not always stable. Therefore, the guide mechanism 70 is especially preferable when such a bag manufacturing and packaging apparatus is disposed on the upstream side.

Note that the present invention is not limited to the embodiments described in detail above, and various modifications and variations can be made which fall within the spirit and scope of the invention. For example, the conveying belts 24, 35 of the upper and lower transfer conveyors 11, 12 are flat belts, however, a round belt and a mesh belt are also preferably applicable.

In addition, when the conveying belts 24, 35 to which the vertical seal portion X1 of the packaging bag X faces are thick, and when a gap G that is large enough for the vertical seal portion X1 to be inserted therein is formed at the time of pressing, the recess grooves 25a, 36a of the top panels 25, 36 may be omitted.

In addition, it is sufficient that the projection members 24a, 35a are disposed at least near the gap G. The projection members 24a, 35a may be configured not to extend in a direction perpendicular to the conveyance direction E1. The projection members 24a, 35a may be provided with various spaces therebetween.

In addition, the seal properties of the packaging bag X may be determined by configuring the servo motor 41 such that the packaging bag X is pressed between the upper and lower transfer conveyors 11, 12 with a space therebetween being maintained at a predetermined distance, and further by having the servo motor 41 detect the reaction force from the packaging bag X to the pressure.

In addition, a guide mechanism comprised of a pair of left and right plate-like members may be used to convey packaging bags X in a stable manner. Needless to say, the guide mechanism 70 is effective for positioning the vertical seal portion X1 also when the packaging bag X is supplied with the vertical seal portion X1 facing either upward or downward.

As described above, the present invention provides a seal checker capable of reliably detecting a faulty seal at a seal portion of a packaging bag or a portion of the packaging bag covered by the seal portion, particularly a vertical seal portion of a packaging bag or a portion thereof covered by the vertical seal portion. In other words, the present invention relates to a seal checker configured to conduct a seal check of packaging bags by pressing the packaging bags, and is widely applicable to the technical field of quality inspection of packaging bags.

GENERAL INTERPRETATION

In understanding the scope of the present invention, the term "configured" as used herein to describe a component, section or part of a device includes hardware and/or software that is constructed and/or programmed to carry out the desired function. In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applied to words having similar meanings such as the terms, "including," "having," and their derivatives. Also, the term "part," "section," "portion," "member," or "element" when used in the singular can have the dual meaning of a single part or a plurality of parts. Moreover, terms that are expressed in "means-plus function" format should be interpreted to include any structure that can be utilized to carry out the function of that part of the present invention. Finally, terms of degree such as "substantially," "about," and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A seal checker comprising:
a lower conveyance unit configured to convey a packaging bag such that a seal portion thereof moves along a conveyance direction;
an upper conveyance unit configured to sandwich and press the packaging bag between the upper conveyance unit and the lower conveyance unit;
a detection unit configured to detect the distance between the upper and lower conveyance units when the packaging bag is pressed thereby or detect the load applied by the upper and lower conveyance units when the packaging bag is pressed thereby; and
a determination unit configured to determine whether or not the packaging bag is sealed based on the distance or the load detected by the detection unit;
wherein the conveyance surface of the conveyance unit that the seal portion faces comprises a pressure-reducing portion that extends in the conveyance direction and prevents the seal portion from being pressed.

2. A seal checker comprising:
a lower conveyance unit configured to convey a packaging bag such that a vertical seal portion thereof moves along a conveyance direction;
an upper conveyance unit configured to sandwich and press the packaging bag between the upper conveyance unit and the lower conveyance unit;
a detection unit configured to detect the distance between the upper and lower conveyance units when the packaging bag is pressed thereby or detect the load applied by the upper and lower conveyance units when the packaging bag is pressed thereby; and
a determination unit configured to determine whether or not the packaging bag is sealed based on the distance or the load detected by the detection unit;
wherein the conveyance surface of the conveyance unit that the vertical seal portion faces comprises a pressure-reducing portion that extends in the conveyance direction and prevents the vertical seal portion from being pressed.

3. The seal checker according to claim 2, wherein a projection member is arranged at least near the pressure-reducing portion on the conveyance surface.

4. The seal checker according to claim 2, wherein
the conveyance unit that the vertical seal portion faces comprises two conveying members that form the conveyance surface, and a plate member that supports the conveying members;
the pressure-reducing portion comprises a gap arranged between the conveying members; and
the plate member comprises a recess groove that is positioned to correspond to the gap.

5. The seal checker according to claim 2, further comprising
a guide unit that is arranged on an upstream side of pressing portions of the upper and lower conveyance units, and configured to guide the packaging bag such that the vertical seal portion is positioned to correspond to the position of the pressure-reducing portion.

* * * * *